United States Patent [19]

Darms et al.

[11] 4,110,188
[45] Aug. 29, 1978

[54] CROSSLINKABLE MIXTURES OF BIS-IMIDYL DERIVATIVES

[75] Inventors: Roland Darms, Therwil; Vratislav Kvita, Muttenz; Gerd Greber, Binningen, all of Switzerland

[73] Assignee: Ciba-Geigy Corporation, Ardsley, N.Y.

[21] Appl. No.: 748,015

[22] Filed: Dec. 6, 1976

[30] Foreign Application Priority Data

Dec. 19, 1975 [CH] Switzerland ............... 16511/75

[51] Int. Cl.$^2$ .................................... C08G 73/12
[52] U.S. Cl. .................. 204/159.22; 204/159.14; 204/159.19; 204/159.23; 528/322
[58] Field of Search ........ 260/47 UA, 47 CP, 78 UA, 260/78 TF, 65, 49; 204/159.14, 159.19, 159.22, 159.23

[56] References Cited

U.S. PATENT DOCUMENTS

| 3,625,912 | 12/1971 | Vincent et al. | 260/30.2 |
| 3,639,357 | 2/1972 | Cohen | 260/78 UA |
| 3,666,720 | 5/1972 | Nieid et al. | 260/47 UA |
| 3,671,490 | 6/1972 | Bargain | 260/47 CP |
| 3,689,464 | 9/1972 | Holub et al. | 260/78 UA |

Primary Examiner—Lester L. Lee
Attorney, Agent, or Firm—Luther A. R. Hall

[57] ABSTRACT

Crosslinkable mixtures of bis-imidyl derivatives and diamines are described, for example of the bis-imide of 2 moles of 3-maleimidyl-phthalic acid anhydride and one mole of 4,4'-diaminodiphenylmethane and a diamine. These mixtures are characterized by their good solubility in a large number of organic solvents, and they can also be processed from the melt. The crosslinked products obtainable therefrom are distinguished in particular by their good thermooxidative stability.

22 Claims, No Drawings

CROSSLINKABLE MIXTURES OF BIS-IMIDYL DERIVATIVES

The present invention relates to crosslinkable mixtures of at least one bis-imidyl derivative and a diamine, to the pre-polymers and crosslinked products obtainable therefrom as well as to a process for producing these pre-polymers and crosslinked products.

The crosslinkable mixtures according to the invention consist of at least one compound of the formula Ia or Ib

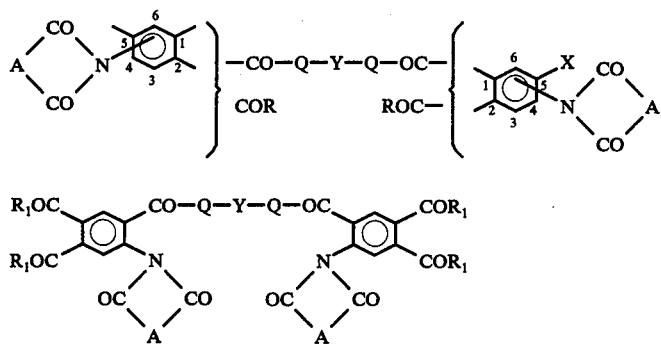

or of a corresponding cyclised derivative, and of at least one diamine of the formula II

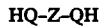  (II), whereby the molar ratio of compound of the formula Ia and/or Ib or of corresponding cyclised derivative to diamine of the formula II is between about 1.2 : 1 to 50 : 1, and wherein the X s independently of one another represent hydrogen, or, if the radical

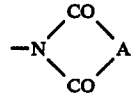

is in the 4-position of the benzene ring, also —$COR_2$, the R s and $R_2$ s independently of one another represent a hydroxyl group, an unsubstituted or substituted phenoxy group, an alkoxy group having 1-18 carbon atoms or an -$O^-M^+$ group,
the $R_1$ s independently of one another represent a hydroxyl group, an unsubstituted or substituted phenoxy group, an alkoxy group having 1-18 carbon atoms, an -$O^-M^+$ group, or
two adjacent $R_1$ s together represent the —O— grouping, the A s independently of one another represent a radical of the formula

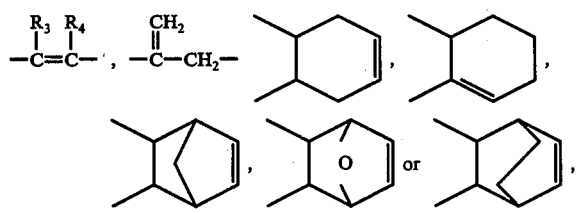

$R_3$ and $R_4$ independently of one another represent hydrogen, chlorine, bromine or methyl, $M^+$ represents an alkali metal cation, a trialkylammonium cation having 3-24, especially 3-12, carbon atoms or a quaternary ammonium cation,
Y and Z independently of one another represent an aliphatic radical having at least two carbon atoms, a cycloaliphatic, carbocyclic-aromatic or heterocyclic-aromatic radical,
Q represents —NH—, or —Q—Y—Q— and/or —Q—Z—Q— represents the grouping

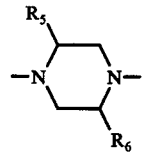

and
$R_5$ and $R_6$ independently of one another represent hydrogen, methyl or phenyl.

The two A s in formula Ia and Ib represent preferably identical radicals as defined, particularly a radical of the formula

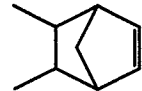

and especially a radical of the formula —CH=CH—.

If R, $R_1$ or $R_2$ represent substituted phenoxy groups, these are, in particular, phenoxy groups substituted by nitro groups, alkyl or alkoxy groups having 1 or 2 carbon atoms, or by halogen atoms, especially chlorine or fluorine, such as the 2-, 3- or 4-nitrophenoxy group, 2,4- or 3,5-dinitrophenoxy group or 3,5-dichlorophenoxy group, the pentachlorophenoxy group, 2-methylphenoxy group or 2-methoxyphenoxy group.

Alkoxy groups R, $R_1$ and $R_2$ can be straight-chain or branched-chain. Examples which may be mentioned are: the methoxy, ethoxy, n-propoxy, isopropoxy, n-butoxy, tertbutoxy, hexyloxy, octoxy, decyloxy, dodecyloxy, tetradecyloxy and octadecyloxy group. The groups preferred are unsubstituted phenoxy groups or alkoxy groups having 1-12 carbon atoms and especially 1-4 carbon atoms.

If R, $R_1$ or $R_2$ represent an -$O^-M^+$ group, $M^+$ represents, for example the lithium, sodium, potassium, trimethylammonium, triethylammonium, methyl-diethylammonium or tri-n-octylammonium cation. Examples of quaternary ammonium cations $M^+$ are the benzyltrimethylammonium and tetramethylammonium cation. M⁺ preferably represents the sodium cation. The R s preferably each represent a hydroxyl group and the $R_2$ s each a hydroxyl group or an alkoxy group having 1-4 carbon atoms. The $R_1$ s preferably each represent an alkoxy group having 1-4 carbon atoms, particularly however a hydroxyl group; or two adjacent $R_1$ s together form the —O— grouping.

Groups or radicals as defined which are denoted by Y or Z can be unsubstituted or substituted, e.g. by halogen atoms such as fluorine, chlorine or bromine, or by alkyl or alkoxy groups each having 1 to 4 carbon atoms.

Aliphatic radicals Y or Z are, in particular, straight-chain or branched-chain alkylene groups having 2 to 12 carbon atoms, especially unsubstituted alkylene groups having 2-10 carbon atoms, whereby the alkylene chain can also be interrupted by hetero atoms, such as by O-O—, S- or N-atoms.

Y and Z as a cycloaliphatic radical represent, e.g., the 1,3- or 1,4-cyclohexylene group, the 1,4-bis-(meythylene)-cyclohexane group or the dicyclohexylmethane group.

If Y or Z represent carbocyclic-aromatic radicals, these are preferably monocyclic, condensed polycyclic or uncondensed bicyclic aromatic radicals and in the case of the last-mentioned the aromatic nuclei can be bound together by way of a bridge member.

Examples of suitable bridge members which may be mentioned are:

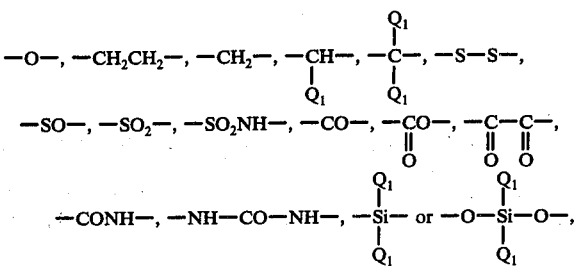

wherein $Q_1$ represents an alkyl group having 1-6, preferably 1-4, carbon atoms, or a phenyl group.

Uncondensed bicyclic aromatic radicals Y or Z can also be bound together by way of two bridge members, such as two —SO₂ groups.

If Y or Z represent a heterocyclic-aromatic radical, such radicals are, in particular, heterocyclic-aromatic 5- or 6-membered rings containing O, N and/or s. S.

Where Q is -NH-, Y and Z preferably represent, independently of one another, an unsubstituted alkylene group having 2-12 carbon atoms, or a monocyclic or uncondensed bicyclic aromatic radical which is unsubstituted or substituted by halogen atoms, alkyl or alkoxy groups each having 1-4 carbon atoms, and in the case of the last-mentioned the aromatic nuclei are bound together directly or by way of the bridge member —O—, —CH₂— or —SO₂—.

Among the compounds of the formula I$a$, those are preferred wherein the two radicals

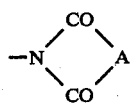

independently of one another are in the 3- or 4-position of the benzene ring, R represents a hydroxyl group, and X represents hydrogen, as well as the corresponding cyclised derivatives.

Among the compounds of the formula I$b$, those are preferred wherein the $R_1$ s each represent an alkoxy group having 1-4 carbon atoms, and especially such compounds wherein the $R_1$ s each represent a hydroxyl group, or two adjacent $R_1$ s together form the —O— grouping.

Particularly preferred are mixtures according to the invention with compounds of the formula I$a$ or I$b$ or with corresponding cyclised derivatives, wherein Q represents —NH—, Y represents a carbocyclic-aromatic radical, especially the 1,3- or 1,4-phenylene group, the 4,4'-diphenylmethane, 4,4'-diphenylsulphone or 4,4'-diphenyl ether group, A represents the radical

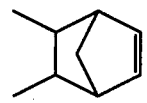

and in particular the radical —CH=CH—, X represents hydrogen, R represents a hydroxyl group, the $R_1$ s each represent a hydroxyl group, or two adjacent $R_1$ s together represent the —O— grouping, and in formula I$a$ the two radicals

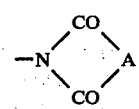

are each in the 3- or 4-position of the benzene ring.

As diamines are preferably used compounds of the formula II wherein the Q s each represent —NH—, and Z represents an unsubstituted alkylene group having 2-10 carbon atoms, or a carbocyclic-aromatic radical, especially the 1,3- or 1,4-phenylene group, the 4,4'-diphenylmethane, 4,4' -diphenylsulphone or 4,4'-diphenyl ether group.

It is also possible to use mixtures of different compounds of the formulae I$a$ and I$b$ or mixtures of different diamines of the formula II.

The molar ratio of compound of the formula I$a$ and/or I$b$, or of corresponding cyclised derivative, and diamine of the formula II is preferably between about 1.3 : 1 and 10 : 1, particularly 1.3 : 1 to 5 : 1.

The compounds of the formula I$a$ or I$b$ can be obtained by reacting (a) a compound of the formula III$a$

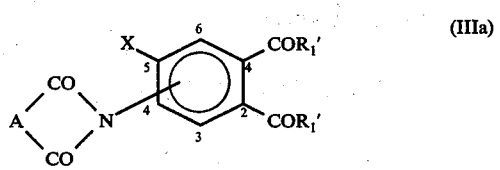

(IIIa)

or (b) a compound of the formula III$b$

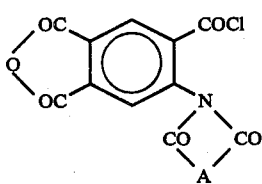
(IIIb)

or a mixture of two different compounds of the formula IIIa or IIIb, wherein A and X have the meanings defined under the formulae Ia and Ib, and the $R_1$'s independently of one another represent a hydroxyl group, an unsubstituted or substituted phenoxy group, an alkoxy group having 1-18 carbon atoms, or the two $R_1$'s together represent the —O— grouping, in a molar ratio of at least 2:1, with a diamine of the formula IV

HQ — Y — QH           (IV), wherein Q and Y or —Q—Y—Q— have the meanings given under formula Ia and Ib; and optionally subsequently cyclising the resulting compound of the formula Ia or Ib and/or converting it into another derivative as defined, i.e. into a compound of the formula Ia or Ib wherein the R s, $R_1$ s or —$COR_2$ s have another meaning as defined. If $R_1$·represents an unsubstituted or substituted phenoxy group or an alkoxy group having 1-18 carbon atoms, preferably 1-12 and especially 1-4 carbon atoms, such groups are, e.g., those mentioned in the foregoing with regard to the meanings of R, $R_1$ and $R_2$. Where cyclisation of the compounds of the formula Ia and Ib is performed, there occurs the formation of imide and in the case of compounds of the formula Ib optionally also of anhydride. Cyclisation is performed, in a manner known per se, chemically or preferably thermally.

Chemical cyclisation is performed advantageously by treatment with a dehydrating agent alone or in admixture with a tertiary amine. It is possible to use, for example, acetic acid anhydride, propionic acid anhydride and dicyclohexylcarbodiimide, or mixtures of acetic acid anhydride and triethylamine.

Thermal cyclisation is performed by heating at a temperature of about 50°-250° C, preferably about 100°-150° C, optionally in a solvent and/or with the addition of a water-entrainer such as xylenes or toluene. At temperatures above about 150° C there occurs in general, at least partially, also a crosslinking.

The conversion into other compounds of the formula Ia or Ib, as defined, can be carried out in a manner known per se, e.g. by hydrolysation of compounds with anhydride groupings to the corresponding free acids, reaction of the free acids with alcohols or with salt-forming bases to give compounds of the formula Ia or Ib wherein R, $R_1$ or $R_2$ represent alkoxy, phenoxy or —$O^-M^+$ groups as defined; or by transesterification.

The compounds or the formulae IIIa and IIIb can be obtained by reacting an amine of the formula V

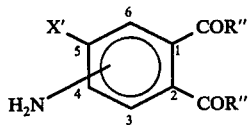
(V)

with an anhydride of the formula VI

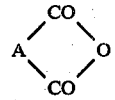
(VI), and subsequently cyclising the resulting amidocarboxylic acid of the formula VII

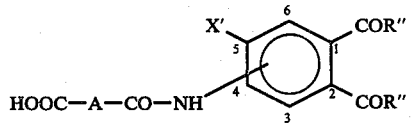
(VII), and optionally converting it into another derivative as defined of the formula IIIa or into a compound of the formula IIIb.

In the above formulae V to VII, A has the given meaning and X' represents hydrogen or, if the amino group is in the 4-position of the benzene ring, also —$COR_2'$, R" and $R_2'$ represent hydroxyl, phenoxy, alkoxy or -$O^-M^+$ groups corresponding to R or $R_2$, whereby however phenoxy groups R" and $R_2'$ are free from electronegative substituents such as nitro groups or halogen atoms, and $R_2'$ in the case where R" is —OH has a meaning other than -$OH^-M^+$, and in the case where R" is -$O^-M^+$ a meaning other than —OH.

Compounds of the formula IIIa wherein $R_1'$ and/or $R_2$ (where X = —$COR_2$) represent phenoxy groups having electronegative substituents are advantageously produced by reaction of the corresponding anhydrides or acid anhydrides with suitable alcohols, or by transesterification of compounds of the formula IIIa with $R_1'$ and/or $R_2$ being alkoxy or phenoxy which is free from electronegative substituents.

The reaction of the amines of the formula V with the anhydride of the formula VI can be performed in the melt, in an aqueous or aqueous-organic medium or preferably in an organic medium.

For cyclisation of the amidocarboxylic acids of the formula VII, it is possible to use customary catalysts such as sodium acetate or triethylamine, and/or dehydrating agents, e.g. acetic acid anhydride. Simultaneously with the imide formation there occurs under certain conditions, i.e. depending on the nature of the substituent R", also the anhydride formation, e.g. if R" = —OH.

The conversion of the cyclised compounds into other defined derivatives of the formula IIIa or into compounds of the formula IIIb is performed in a conventional manner, for example by the methods mentioned in the foregoing.

Acid chlorides of the formula IIIb can be produced, e.g., by reaction of compounds of the formula IIIa, wherein X = $COR_2$ and $R_2$ = —OH or -$O^-M^+$, with suitable chlorinating agents, such as thionyl chloride.

The diamines of the formulae II and IV are known per se. The following may be mentioned as examples of suitable diamines of the formula II or IV: o-, m- and p-phenylenediamine, diaminotoluenes such as 2,4-diaminotoluene, 1,4-diamino-2-methoxybenzene, 2,5-diaminoxylene, 1,3-diamino-4-chlorobenzene, 4,4'-diamino-diphenylmethane, 4,4'-diaminodiphenyl ether, 4,4'-diaminodiphenylthio ether, 4,4'-diaminodiphenylsulphone, 2,2'-diaminobenzophenone, 4,4'-diaminodiphenylurea, 1,8- or 1,5-diaminonaphthalene, 2,6- diaminopyridine, 2,4-diaminopyrimidine, 1,4-piperazine, 2,4-diamino-s-triazine, di-, tri-, tetra-, hexa-, hepta-, octa-, deca- and dodecamethylenediamine, 2,2-dimethylpropylenediamine, 2,5-dimethylhexamethylenediamine, 4,4-dimethylheptamethylenediamine, 3-methylheptamethylene diamine, 3-methoxyhexamethylenediamine, 2,11-diaminododecane, 2,2,4- and 2,4,4-trimethylhexamethylenediamine, 1,2-bis (3-aminopropoxy)-ethane, N,N'-dimethylethylenediamine, N,N'-dimethyl-1,6-diaminohexane, as well as the diamines of the formulae $H_2N(CH_2)_3O(CH_2)_2O(CH_2)_3NH_2$ and $H_2N(CH_2)_3$-$S(CH_2)_3NH_2$, and 1,4-diaminocyclohexane.

Imidised and optionally partially crosslinked pre-polymers can be produced by heating the mixtures according to the invention at temperatures of between about 100 and 300° C, preferably between 100° and 200° C. The prepolymers according to the invention still contain crosslinkable groups, are soluble in the usual organic solvents such as N,N-dimethylformamide, N,N-dimethylacetamide and N-methylpyrrolidone, and in general can also be processed from the melt. The pre-polymers can be produced in a manner known per se, e.g. in the melt or in the presence of an inert organic solvent.

Organic solvents which can be used are, for example:
- chlorinated aromatic and aliphatic hydrocarbons, such as chlorobenzene, methylene chloride, chloroform, tetrachloroethane and tetrachloroethylene;
- aliphatic and cycloaliphatic ketones, such as acetone, methyl ethyl ketone, cyclopentanone and cyclohexanone;
- cyclic ethers, such as tetrahydrofuran, tetrahydropyrane and dioxane;
- cyclic amides, such as N-methyl-2-pyrrolidone, N-acetyl-2-pyrrolidone and N-methyl-ε-caprolactam;
- N,N-dialkylamides of aliphatic monocarboxylic acids having 1-3 carbon atoms in the acid moiety, such as N,N-dimethylformamide, N,N-dimethylacetamide, N,N-diethylacetamide, N,N-dimethyl-methoxyacetamide;
- alkyl esters of aliphatic monocarboxylic acids with a total of 2-6 carbon atoms, such as formic acid methyl, ethyl and n-butyl esters or acetic acid methyl, ethyl and n-butyl esters;
- ethylenemonoalkylethers and ethylenedialkylethers each containing 1-4 carbon atoms in the alkyl moieties, such as ethylene glycol monomethyl ether, ethylene glycol monoethyl ether, ethylene glycol monoisopropyl ether and ethylene glycol mono-n-butyl ether, ethylene glycol dimethyl ether and ethylene glycol diethyl ether,
- hexamethylphosphoric acid triamide (hexametapol),
- N,N,N',N'-tetramethylurea,
- tetrahydrothiophene dioxide (sulpholane), and
- dialkylsulphoxides, such as dimethyl- and diethylsulphoxide.

Also mixtures of such solvents can be used. Preferred solvents are methylene chloride, chloroform, N,N-dialkylamides of aliphatic monocarboxylic acids having 1-3 carbon atoms in the acid moiety, especially N,N-dimethylacetamide, as well as cyclic amides such as N-methyl-2-pyrrolidone.

Depending on the purpose of application, it can be advantageous to perform the reaction in the presence of catalytic amounts of a strong acid (about 0.5 - 5 per cent by weight, relative to the weight of the compound of the formula Ia or Ib) and optionally in the presence of a radical initiator or a radical inhibitor.

Strong acids which can be used are, for example, inorganic or organic acids having a pKa-value in water of below 5, such as hydrochloric, hydrobromic and hydrofluoric acid, perchloric acid, sulphuric acid, phosphoric acid, nitric acid, aromatic or aliphatic sulphonic acids and saturated or unsaturated aliphatic carboxylic acids, such as methanesulphonic acid, benzenesulphonic acid, p-toluenesulphonic acid, dichloro- and trichloroacetic acid, trifluoroacetic acid and maleic acid.

Examples of suitable radical initiators are inorganic and organic peroxides or azo compounds, e.g. hydrogen peroxide, tert.butylhydroxy peroxide, peracetic acid, benzoyl peroxide, tert.butylperbenzoate, cumolhydroperoxide, dicumyl peroxide and α,α'-azoisobutyronitrile.

Suitable radical inhibitors are, e.g., hydroquinone, brenzcatechin, di-tert.butyl cresol, picric acid and diphenylpicryl hydrazine.

The pre-polymers according to the invention can be converted in a second stage, by known methods, into fully crosslinked products, which are insoluble in the usual organic solvents. Alternatively, it is also possible to process and to crosslink directly the mixtures, according to the invention, of compounds of the formula Ia or Ib and diamines. The crosslinking can be performed, in a manner known per se, chemically or thermally, or under the influence of electromagnetic waves, especially light. Chemical crosslinking is generally performed at temperatures of about 50 to 250° C, in the presence of radical initiators of the aforementioned type. Thermal crosslinking is carried out advantageously by heating at temperatures up to about 350° C, preferably 150°-250° C, and also radical initiators may be concomitantly used. Crosslinking under the influence of electromagnetic waves can be performed, e.g., by irradiation with X-rays or with UV light, and optionally in the presence of sensitisers, such as benzene, 1,4-diacetylbenzene, phenol, benzonitrile, acetophenone, benzophenone, benzaldehyde, di-isopropyl ketone and fluorene.

Pre-polymers according to the invention which are formed from at least one compound of the formula Ia and at least one diamine of the formula II can be obtained also by a particularly simple and economical process comprising reacting a compound of the formula IIIa or a mixture of two different compounds of the formula IIIa, in a molar ratio of at least 2:1, with a diamine of the formula IV; and heating the resulting bis-imidyl derivative of the formula Ia without intermediate isolation, in a molar ratio of about 1.2 : 1 to 50 : 1 and optionally in the presence of a reinforcing material and/or of an inert organic solvent, with a diamine of the formula II at temperature of about 100°-300° C. The pre-polymers thus obtained can be optionally subsequently crosslinked chemically, thermally or under the influence of electromagnetic waves.

Depending on the reaction constituents and reaction temperatures, the intermediately formed compounds of the formula Ia with the diamines of the formula II can also be converted directly into fully crosslinked products. This process has proved particularly advantageous, because it is possible, without loss of quality, to dispense with the separate synthesis and isolation of the compounds of the formula Ia, and in place of these to use the readily available starting products of the formula IIIa.

The reaction is advantageously performed in an inert organic solvent of the aforementioned kind. Preferred solvents are methylene chloride, chloroform, N,N-dialkylamides of lower monocarboxylic acids, as defined, particularly dimethylacetamide, and especially ethylene glycol monoalkyl ethers having 1-4 carbon atoms in the alkyl moiety, such as ethylene glycol monomethyl ether and ethylene glycol monoethyl ether.

With regard to the reaction of the compounds of the formula IIIa with the diamines of the formula IV, to the preferred reactants of the formulae II, IIIa and IV, as well as to the preferred molar ratios, the information which has been given in the foregoing is valid.

The above process is particularly suitable for producing reinforced laminates. As reinforcing materials, it is possible to use organic or inorganic substrates known per se, advantageously in the form of powders, filaments or fibres, such as carbon, silicates, asbestos, synthetic or natural fibres, metal filaments, metal oxide powders and, in particular, glass fibres, e.g. in the form of glass fabrics.

The mixtures and pre-polymers according to the invention are suitable for the production of industrial products, such as coating compounds, lacquers, foam plastics, adhesives, laminating resins, composite materials, moulding powders, moulded articles and so forth, in a manner known per se and optionally with the use of customary additives, such as pigments, fillers, etc.

The particularly good solubility of the uncyclised bis-imidyl derivatives of the formula Ia and Ib usable according to the invention, or of the mixtures according to the invention, in a large number of organic solvents, compared with the solubility of known bis-maleamide acids, renders possible the production of particularly highly concentrated, low viscous solutions which are, for example, excellently suitable as laminating solutions. The mixtures and pre-polymers according to the invention can also be processed from the melt. The products obtained after crosslinking have good mechanical, electrical and/or thermal properties and, compared with known polymers of a comparable type, are distinguished further by an increased thermooxidative stability.

EXAMPLE 1

24.32 g (0.0375 mole) of a bis-3-maleimidyl-phthalimide obtained by reaction of 3-maleimidyl-phthalic acid anhydride with 4,4'-diaminodiphenylmethane is intimately mixed with 2.97 g (0.015 mole) of 4,4'-diaminodiphenylmethane by dissolving the two constituents in methylene chloride, evaporating off the solvent at 50° C in a rotary evaporator and grinding the evaporation residue. The mixture obtained is heated for 30 minutes at 180° C under nitrogen to obtain 25.3 g of a pre-polymer, which is ground to a fine powder.

The bis-3-maleimidyl-phthalimide used in the above example is produced as follows: 91.89 g (0.378 mole) of 3-maleimidyl-phthalic acid anhydride is dissolved in 343 ml of anhydrous N,N-dimethylacetamide (DMA) in a nitrogen atomosphere in a sulphonating flask, and the solution is cooled to 0°–5° C. To this is added dropwise, with stirring, a solution of 35.68 g (0.18 mole) of 4,4'-diaminodiphenylmethane in 200 ml of DMA, and the reaction mixture is stirred after completion of the addition for 2 hours at 20°–25° C. An addition is then made of 132 ml (1.44 moles) of acetic acid anhydride, and the solution is heated, with stirring, for 2 hours at 80° C.

After cooling to about 20°–25° C, the reaction product is precipitated with water. The precipitate obtained is filtered, washed several times with water in a mixer and dried for 20 hours at 80° C in a vacuum chamber. The reaction product is then boiled in approximately the ten-fold amount by weight of ethanol for 20 minutes, and subsequently filtered hot. After drying at 80° C under high vacuum, there is obtained 107 g of bis-3-maleimidylphthalimide of the formula

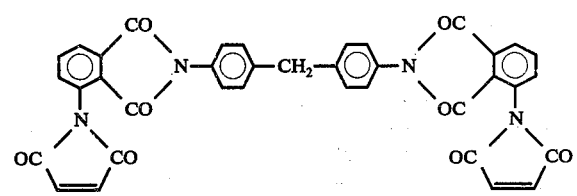

as a slightly yellowish powder; m.p. 190°–210° C. The three-maleimidylphthalic acid anhydride used as starting product can be produced, in a manner known per se, by reaction of 3-aminophthalic acid with maleic acid anhydride and cyclisation of the resulting amide acid with anhydrous sodium acetate and acetic anhydride (see DOS No. 2,459,673).

EXAMPLE 2

The pre-polymer produced according to Example 1 is introduced for processing by the compression process into a compression mould, preheated to 240° C, for standard test bars, and moulded at this temperature for 1 hour under a pressure of 250 kg/cm². The transparent bars resulting are removed and annealed for 16 hours at 240° C to increase their strength. There are obtained solid moulded specimens the flexural strength of which has not decreased after 500 hours' ageing at 240° C in air. In an analogous manner are produced circular discs which have excellent electrical properties at elevated temperatures (tg δ at 240° C. = 0.0040).

EXAMPLE 3

22.68 g (0.035 mole) of the bis-3-maleimidyl-phthalimide described in Example 1 and 4.16 g (0.021 mole) of 4,4'-diaminodiphenylmethane are mixed as described in Example 1 and reacted to give a pre-polymer. There is obtained 24.8 g of a brownish powder, which is processed into transparent moulded specimens as described in Example 2.

EXAMPLE 4

16.20 g (0.025 mole) of the bis-3-maleimidyl-phthalimide described in Example 1 and 3.96 g (0.020 mole) of 4,4'-diaminodiphenylmethane are mixed and reacted as given in Example 1. There is obtained 18.10 g of a pre-polymer in the form of a brown-red powder, which is processed by the compression process into transparent moulded specimens.

EXAMPLE 5

15.31 g (0.063 mole) of a 1:1-mixture of 3-maleimidylphthalic acid anhydride and 4-maleimidylphthalic acid anhydride are reacted in 200 ml of DMA with 5.94 g (0.03 mole) of 4,4'-diaminodiphenylmethane. 9.73 g (0.015 mole) of the mixture, obtained after precipitation, washing and drying, of the isomeric bis-maleimidyl-phthalimides (m.p. 180°–210° C) and 1.19 g (0.006 mole) of 4,4'-diaminodiphenylmethane is reacted as described in Example 1. For moulding, the resulting pre-polymer is introduced into a compression mould, heated to 220° C, for circular discs and moulded with a pressure of 225 kg/cm². Within one hour, the pressure is increased to 325 kp/cm² and the temperature to 250° C. On removal from the mould, transparent solid moulded specimens having good electrical properties are obtained.

EXAMPLE 6

In a sulphonating flask, 23.8 g (0.12 mole) of 4,4'-diaminodiphenylmethane is dissolved in 120 ml of ethyleneglycol monomethyl ether in a nitrogen atmosphere, and the mixture is cooled to 0°–5° C. An addition is made portionwise at this temperature, with stirring, of 58.34 g (0.24 mole) of 3-maleimidyl-phthalic acid anhydride. The reaction solution is afterwards stirred for 2 hours at 20°–25° C. The reaction solution is subsequently again cooled to 0°–5° C and 9.52 g (0.048 mole) of 4,4'-diaminodiphenylmethane and 24 ml of ethylene glycol monomethyl ether are added to obtain a 40% laminating solution, which is stirred at 20°–25° C for a further hour. Viscosity of the laminating solution = 1.5 poises.

Glass fabric (e.g. so-called E glass having an aminosilane finish) is impregnated by passing the fabric once through the above laminating solution. The impregnated fabric is afterwards dried in the following manner: 3 hours at 80° C/20 torr, 30 minutes at 100° C/$10^{-1}$ torr, 30 minutes at 120° C/$10^{-1}$ torr and 30 minutes at 180° C/$10^{-1}$ torr. Eight of the dried prepregs obtained in this manner (dimensions 11 × 18 cm) are stacked on top of one another and moulded in a platen press at 260° C to form laminates, moulding being performed for 3 minutes with contact pressure and then for 30 minutes with a pressure of 20 kp/cm². The pressure is periodically released in order to facilitate the removal of any volatile products. Moulding is subsequently performed for a further one hour with a pressure of 45 kp/cm². The resulting laminates are then cured for 16 hours at 220° C in an air-circulation furnace. The resin content of the laminates is 26 percent by weight (determined by incineration). Well bonded, bubble-free laminates having good thermal stability and excellent mechanical and electrical properties are obtained. The flexural strength (590 N/mm²) for example has not decreased after 300 hours' ageing at 240° C in air.

COMPARATIVE EXAMPLE

If the 3-maleimidyl-phthalic acid anhydride in Example 6 is replaced with the equivalent amount of maleic acid anhydride, no impregnating solution is obtained, since the formed amide acid precipitates from the ethylene glycol monomethyl ether, and the reaction mixture hardens.

On the other hand, a 35% solution in DMA can be produced as follows: In a sulphonating flask, 14.71 g (0.15 mole) of maleic acid anhydride is dissolved in 50 ml of anhydrous DMA in a nitrogen atmosphere, and the solution is cooled to 0°–5° C. An addition is made portionwise, with stirring, of 15.77 g (0.075 mole) of 4,4'-diaminodiphenylmethane, whereby the reaction mixture becomes solid. By the addition of 50 ml of DMA, there is again obtained a solution which is stirred for 2 hours at room temperature (20°–25° C). The reaction mixture is again cooled to 0° C and a solution of 5.95 g (0.03 mole) of 4,4'-diaminodiphenylmethane in 16 ml of DMA is added dropwise. This solution is subsequently stirred at 20°–25° C for a further hour, and thereupon concentrated to 35% under high vacuum by distilling off 42 ml of DMA.

Glass fabric, e.g. so-called E glass having an aminosilane finish, is impregnated by passing the fabric twice through the above laminating solution. The impregnated fabric is afterwards dried for 16 hours at 70° C/20 torr and for 75 minutes at 140° C/$10^{-1}$ torr. Eight of the prepregs thus obtained (dimensions 9 × 11 cm) are placed on top of one another and moulded in a platen press at 220° C to form laminates, moulding being performed for 3 minutes with contact pressure and for 30 minutes with a pressure of 60 kp/cm². The laminates are subsequently cured for 16 hours at 220° C in an air-circulation furnace. There are obtained well bonded, bubble-free laminates, the thermal stability of which, however, is less than that of the laminates according to Example 6. The flexural strength of 460 N/mm² falls after 300 hours' ageing at 240° C in air to 316 N/mm².

EXAMPLE 7

In a manner analogous to that described in Example 6, 11.9 g (0.06 mole) of 4,4'-diaminodiphenylmethane, 29.17 g (0.12 mole) of a 1:1-mixture of 3-maleimidyl-phthalic acid anhydride and 4-maleimidyl-phthalic acid anhydride and a further 4.76 g (0.024 mole) of 4,4'-diaminodiphenylmethane in 72 ml of ethylene glycol monomethyl ether are reacted. The 40% laminating solution obtained is used to impregnate a glass fabric by passing this once through the laminating solution. The impregnated fabrics are dried for 16 hours at 70° C/20 torr and for 75 minutes at 110° C/$10^{-1}$ torr. Eight of the dried prepregs thus obtained (dimensions 8 × 11 cm) are placed on top of one another and moulded in a platen press at 240° C to form laminates, moulding being performed for 3 minutes with contact pressure, for 15 minutes with a pressure of 25 kp/cm² and for 15 minutes with a pressure of 50 kp/cm², whereby the pressure is periodically released in order to facilitate the removal of volatile products. The laminates are subsequently cured for 16 hours at 220° C in an air-circulation furnace. The resin content of the laminates is 29 percent by weight (determined by incineration). Well bonded, bubble-free laminates having good thermal stability and excellent mechanical and electrical properties are obtained.

EXAMPLE 8

24.31 g (0.1 mole) of 3-maleimidyl-phthalic acid anhydride is dissolved in 300 ml of methylene chloride and the solution is cooled to 0° C. A solution of 9.92 g (0.05 mole) of 4,4-diaminodiphenylmethane in 120 ml of methylene chloride is added dropwise with stirring, whereupon the amide acid of the bis-3-maleimidyl-phthalimide described in Example 1 instantly forms as a precipitate. The reaction mixture is stirred for 1 hour at 20°–25° C. A solution of 4.16 g (0.021 mole) of 4,4'-diaminodiphenylmethane in 25 ml. of methylene chloride is then added dropwise and the reaction mixture is again stirred for 1 hour at 20°-25° C. The solvent is subsequently evaporated off in a rotary evaporator. The residue is heated for 45 minutes at 180° C/20 torr to obtain 29.5 g of a pre-polymer in the form of a yellow powder.

For processing by the compression process, the pre-polymer obtained is introduced into a compression mould for standard test bars, which is preheated to 260° C, and moulded at this temperature for 1 hour with a pressure of 250 kp/cm². After removal from the mould, the transparent bars resulting are annealed at 240° C for 16 hours. Solid moulded specimens are obtained, the flexural strength of which has not decreased after 300 hours' ageing at 240° C in air.

In an analogous manner are obtained circular discs having excellent electrical properties at elevated temperatures (tg δ at 240° C = 0.0020).

EXAMPLE 9

15.31 g (0.63 mole) of a 1:1-mixture of 3-maleimidyl-phthalic acid anhydride and 4-maleimidyl-phthalic acid anhydride is reacted in 200 ml of DMA with 5.94 g (0.03 mole) of 4,4'-diaminodiphenylmethane. 6.49 g (0.01 mole) of the mixture (obtained after precipitation, washing and drying) of the isomeric bis-maleimidylphthalimides and 0.63 g of (0.004 mole) of 2,4,4-trimethyl-hexamethylenediamine are mixed in 150 ml of absolute ethanol, and the solvent is thereupon evaporated off in a rotary evaporator. The residue is heated in a nitrogen atmosphere for 30 minutes at 180° C. For moulding, the resulting pre-polymer is introduced into a compression mould for circular discs, which is preheated to 200° C, and moulded with a pressure of 325 kp/cm² for 30 minutes at 200° C, for 20 minutes at 225° C and for 20 minutes at 250° C. Moulded specimens of good solidity are obtained.

EXAMPLE 10

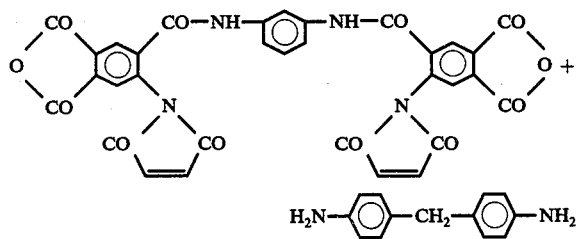

In a sulphonating flask, 1.08 g (0.01 mole) of m-phenylenediamine is dissolved in 30 ml of anhydrous DMA in a nitrogen atmosphere, and the solution is cooled to −15° C. 5.83 g (0.02 mole) of 4-maleimidyl-trimellitic acid anhydride chloride is added, with stirring, in such a manner that the temperature of the reaction mixture does not exceed −15° C. Stirring is then continued at −15° C for 30 minutes and subsequently at 20°-25° C for 1 hour. The reaction mixture is thereupon cooled again to −15° C and 2.02 g (0.02 mole) of triethylamine in 2 ml of DMA is added dropwise; there is formed a white precipitate. The reaction mixture is stirred for 1 hour at 20°-25° C; it is again cooled to −15° C and 0.59 g (0.006 mole) of 4,4'-diaminodiphenylmethane is then added. After 1 hour's stirring at 20°-25° C, the precipitated triethylamine hydrochloride is filtered off and the reaction solution is poured onto aluminum sheets. The coatings are dried and cross-linked for 16 hours at 80° C/20 torr, for 2 hours at 100° C/20 torr, for 2 hours at 120° C/20 torr, for 2 hours at 140° C/20 torr, for 2 hours at 150° C/20 torr and for 16 hours at 200° C/10⁻¹ torr. Transparent flexible coatings are obtained.

The 4-maleimidyltrimellitic acid anhydride chloride used in the above Example can be produced as follows: 102 g (0.4 mole) of 4-nitrotrimellitic acid (obtained by nitration of trimellitic acid anhydride with $H_2SO_4$/$HNO_3$) is hydrogenated in the presence of 10 g of a palladium charcoal catalyst, containing 5 percent by weight of Pd, at 30° C in 1000 ml of dioxane. The reaction solution is filtered and 46.8 g (0.48 mole) of maleic acid anhydride is subsequently added. The reaction mixture is left to stand for 12 hours at 20°-25° C and then concentrated at 60° C to dryness in a rotary evaporator. The residue is heated to boiling twice with 400 ml of acetic acid ethyl ester each time, with stirring being maintained; it is then filtered off with suction and dried at 80° C/100 torr for 24 hours to obtain 105 g of 5-maleamidyltrimellitic acid. 32.3 g (0.1 mole) of 4-maleamidyltrimellitic acid is mixed with 1.6 g of anhydrous sodium acetate and 83 ml of acetic anhydride, and heated for 30 minutes at 80° C. The formed solution is concentrated by evaporation to dryness and subsequently dried at 50° C/0.05 torr. To residue is added 200 ml of thionyl chloride and the mixture is heated for 2.5 hours at 80° C. The reaction mixture is then concentrated by evaporation to dryness; 150 ml of benzene is added, filtration is performed and the filtrate is concentrated by evaporation and finally dried at 80° C/0.1 torr. After washing with cyclohexane and benzene and drying, there is obtained 18.31 g of crystalline 4-maleimidyltrimellitic acid anhydride chloride having a melting point of 143°-144° C.

EXAMPLE 11

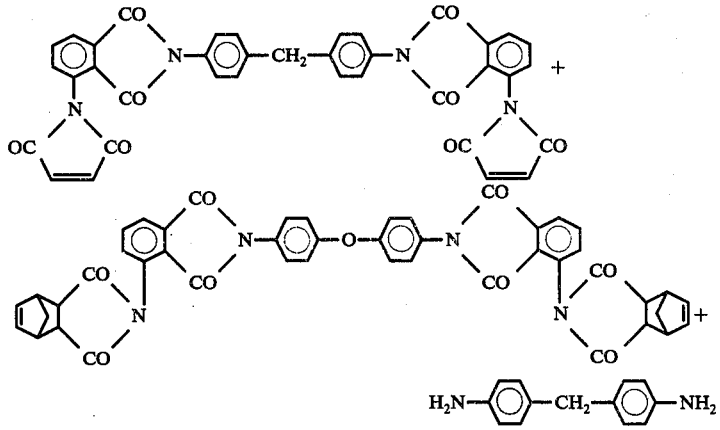

6.48 g (about 0.01 mole) of a 1:1-mixture of 4,4'-bis-(3-maleimidylphthalimidyl)-diphenylmethane and 4,4'-bis-(3-nadicimidylphthalimidyl)-diphenyl ether are intimately mixed with 0.80 g (0.004 mole) of 4,4'- diaminodiphenylmethane, and the mixture is heated for 8 minutes at 300° C. The formed melt after cooling is ground to a fine powder. This is moulded in a platen press at 250° C for 5 minutes under contact pressure and for 5 minutes with a pressure of 100 kp/cm². It is afterwards heated in the press again under contact pressure for 1 hour at 250° C and for 2 hours at 270° C. Transparent solid plates are obtained.

The bis-imides used in the above Example can be produced as follows: In a sulphonating flask, 91.89 g (0.378 mole) of 3-maleimidyl-phthalic acid anhydride is dissolved in 343 ml of anhydrous DMA in a nitrogen atmosphere, and the solution is cooled to 0°–5° C. To this is added dropwise, with stirring, a solution of 35.68 g (0.18 mole) of 4,4'-diaminodiphenylmethane in 200 ml of DMA, and the reaction mixture after completion of the addition is stirred at 20°–25° C for a further 2 hours. An addition is then made of 132 ml (1.44 moles) of acetic acid anhydride, and the solution is heated, with stirring, for 2 hours at 80° C. After cooling to about 20°–25° C, the reaction product is precipitated with water. The resulting precipitate is filtered off, washed several times with water and dried for 20 hours at 80° C in a vacuum drying chamber. The reaction product is then boiled in about the ten-fold amount by weight of ethanol for 20 minutes, and subsequently filtered hot. After drying at 80° C under high vacuum, there is obtained 107 g of 4,4'-bis-(3-maleimidylphthalimidyl)-diphenylmethane in the form of a slightly yellowish powder, m.p. 190°–210° C.

In an analogous manner, 15.4 g (0.05 mole) of 3-nadicimidylphthalic acid anhydride is dissolved in 195 ml of DMA in a nitrogen atmosphere in a sulphonating tube, and the solution is cooled to 0°–5° C. There is then added dropwise, with stirring, a solution of 5.0 g (0.025 mole) of 4,4'-diaminodiphenyl ether in 50 ml of toluene. After being stirred for 1 hour at 20°–25° C, the reaction solution is refluxed until, with the aid of a water-separator, no further water is separated from the reaction mixture. The toluene is subsequently distilled off and the reaction solution is poured into water. The resulting precipitate is filtered off, washed several times with water and dried in a vacuum oven at 80° C. There is obtain 16.55 g of 4,4'-bis-(3-nadicimidylphthalimidyl)-diphenyl ether.

3-Nadicimidylphthalic acid anhydride [3 -(bicyclo[1.2.2.]-hept-5-ene-2,3-dicarboxylic acid-imidyl)-phthalic acid anhydride] is produced, in a manner known per se, by reaction of 3-aminophthalic acid with nadic acid anhydride and cyclisation of the resulting 3-nadicamidyl-phthalic acid with anhydrous sodium acetate and acetic anhydride (see DOS 2,459,673).

We claim:

1. A crosslinkable mixture, essentially unpolymerized and stable at temperatures up to about 100° C, consisting of at least one compound of the formula Ia or Ib

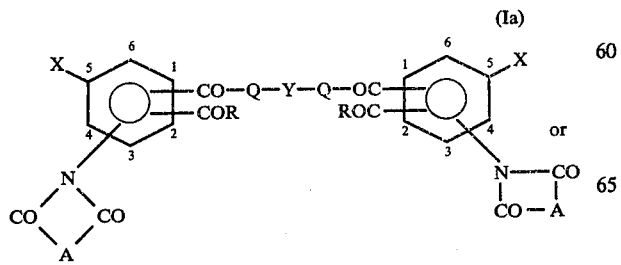

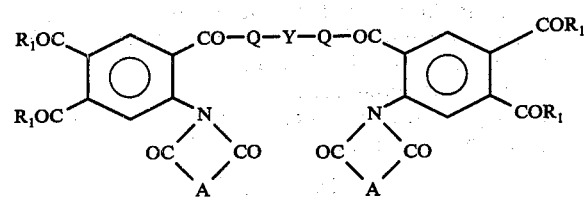

where in formula Ia the

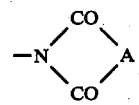

groups independently of each other are linked to the benzene rings in the 3- or 4- position; and a carbonyl of the —COQYQOC— moiety and a -COR group are attached in pairs to adjacent carbon atoms at the 1- and 2-positions of the benzene rings, whereby on each benzene ring one of said carbonyl and —COR groups can be in the 1-position and the other in the 2-position; or of a corresponding cyclised derivative, and of at least one diamine of the formula II $$HQ-Z-QH \qquad (II);$$

whereby the molar ratio of the compound of the formula Ia and/or Ib, or of a corresponding cyclised derivative, to diamine of the formula II is between about 1.2: 1 to 50: 1, and wherein the X's independently of one another represent hydrogen or, if the radical

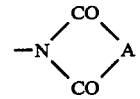

is in the 4-position of the benzene ring, also —COR₂, the R's and R₂'s independently of one another represent a hydroxyl group, phenoxy; phenoxy substituted by one or two nitro groups, by one alkyl of 1 to 2 carbon atoms, by one alkoxy of 1 to 2 carbon atoms or by two to five halogen atoms; alkoxy of 1 to 18 carbon atoms or an O⁻M⁺ group, the R₁'s independently of one another represent a hydroxyl group, phenoxy; phenoxy substituted by one or two nitro groups, by one alkyl of 1 to 2 carbon atoms, by one or two alkoxy of 1 to 2 carbon atoms or by two to five halogen atoms; alkoxy of 1 to 18 carbon atoms or an O⁻M⁺ group, or two adjacent R₁'s together represent the —O— grouping, the A's independently of one another represent a radical of the formula

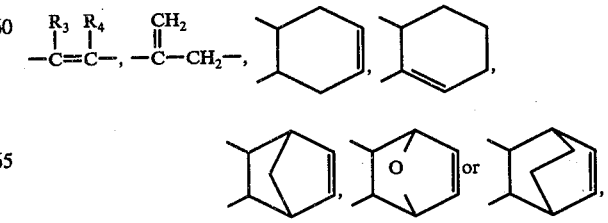

$R_3$ and $R_4$ independently of one another represent hydrogen, chlorine, bromine or methyl, $M^+$ represents an alkali metal cation, a trialkylammonium cation having 3–24 carbon atoms, or a quaternary ammonium cation, Y and Z independently of one another represent an aliphatic radical having at least two carbon atoms, a cycloaliphatic, carbocyclic-aromatic or heterocyclic-aromatic radical, Q represents —NH—, or —Q—Y—Q— and/or —Q—Z—Q— represents the grouping

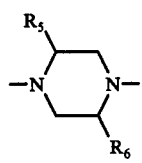

and $R_5$ and $R_6$ independently of one another represent hydrogen, methyl or phenyl.

2. A crosslinkable mixture according to claim 1 which contains at least one compound of the formula Ia or a corresponding cyclised derivative, wherein the two radicals

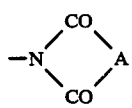

independently of one another are in the 3- or 4-position of the benzene ring, R represents a hydroxyl group, X represents hydrogen, and A represents a radical of the formula

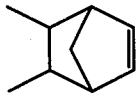

or —CH=CH—.

3. A crosslinkable mixture according to claim 1 which contains at least one compound of the formula Ib wherein the $R_1$'s each represent a hydroxyl group, or two adjacent $R_1$'s together represent the —O— grouping, and A represents a radical of the formula

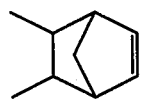

or —CH=CH—.

4. A crosslinkable mixture according to claim 10 which contains at least one compound of the formula Ia or Ib or a corresponding cyclised derivative, wherein Q represents —NH—, Y represents the 1,3- or 1,4-phenylene group, the 4,4'-diphenylmethane group, 4,4'-diphenylsulphone group, or 4,4'-diphenyl ether group, A represents the radical

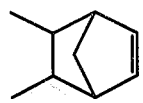

or —CH=CH—, X represents hydrogen, R represents a hydroxyl group, or the $R_1$'s each represent a hydroxyl group, or two adjacent $R_1$'s together represent the —O— grouping, whereby in formula Ia the two radicals

are each in the 3- or 4-position of the benzene ring.

5. A crosslinkable mixture according to claim 1 which contains at least one diamine of the formula II wherein Q represents —NH—, and Z represents an unsubstituted alkylene group having 2–10 carbon atoms, or the 1,3- or 1,4-phenylene group, the 4,4'-diphenylmethane group, 4,4'-diphenylsulphone group or 4,4'-diphenyl ether group.

6. A crosslinkable mixture according to claim 1 having a molar ratio of compound of the formula Ia and/or Ib, or of a corresponding cyclised derivative, to diamine of the formula II of about 1.3 : 1 to 10 : 1.

7. A mixture according to claim 2 wherein A represents —CH=CH—.

8. A mixture according to claim 3 wherein A represents —CH=CH—.

9. A mixture according to claim 4 wherein A represents —CH=CH—.

10. A mixture according to claim 6 wherein the molar ratio of compound of formula Ia and/or Ib, or a corresponding cyclized derivative, to diamine of formula II is about 1.3:1 to 5:1.

11. A crosslinkable prepolymer, soluble in organic solvents, obtained by heating a mixture according to claim 1 at a temperature between about 100° and 300° C.

12. A crosslinkable prepolymer according to claim 11 which is obtained by reacting a compound of the formula IIIa

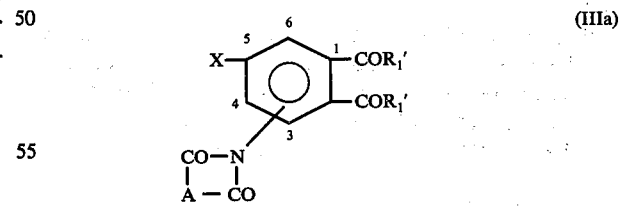 (IIIa)

or a mixture of two different compounds of formula IIIa, wherein X is hydrogen or, if the radical

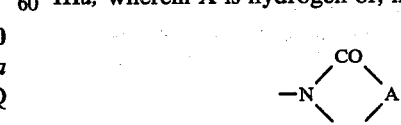

is in the 4-position of the benzene ring, also —$COR_2$, A is a radical of the formula

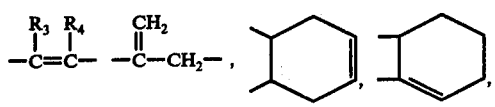, 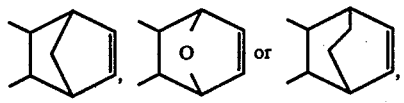

$R_3$ and $R_4$ independently of one another represent hydrogen, chlorine, bromine or methyl, $R_2$ is hydroxyl, phenoxy; phenoxy substituted by one or two nitro groups, by one alkyl of 1 to 2 carbon atoms, by one alkoxy of 1 to 2 carbon atoms, by one alkoxy of 1 to 2 carbon atoms or by two to five halogen atoms; alkoxy of 1 to 18 carbon atoms or an $O^-M^+$ group, $M^+$ represents an alkali metal cation, a trialkylammonium cation having 3 to 24 carbon atoms, or a quaternary ammonium cation, and the $R_1$'s independently of one another represent a hydroxyl group, phenoxy; phenoxy substituted with one or two nitro groups, by one alkyl of 1 to 2 carbon atoms, by one alkoxy of 1 to 2 carbon atoms or by two to five halogen atoms; alkoxy of 1 to 18 carbon atoms, or the two $R_1$'s together represent the 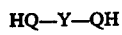 grouping, in a molar ratio of at least 2:1 with a diamine of the formula IV $$HQ-Y-QH \qquad (IV)$$

where Q is —NH—,

Y is an aliphatic radical of at least two carbon atoms, a cycloaliphatic, carbocyclic-aromatic or heterocyclic-aromatic radical, or —Q—Y—Q represents the grouping

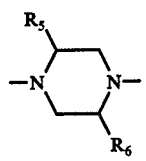

and $R_5$ and $R_6$ independently of one another represent hydrogen, methyl or phenyl, and heating the resulting bis-imidyl derivatives of formula Ia without intermediate isolation, in a molar ratio of about 1.2:1 to 50:1 with a diamine of formula II $$HQ-Z-QH \qquad (II)$$

where Z is independent of Y and is an aliphatic radical of at least two carbon atoms, a cycloaliphatic, carbocyclic-aromatic or heterocyclic-aromatic radical, and Q—Z—Q is independent of Q—Y—Q and represents the grouping

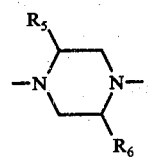

at a temperature between about 100° and 300° C.

13. A crosslinkable prepolymer according to claim 12 contains additionally a reinforcing material selected from the group consisting of carbon, silicates, asbestos, synthetic fibers, natural fibers, metal filaments, metal oxide powders, glass fibers and glass fabrics.

14. A crosslinkable prepolymer according to claim 12 wherein the prepolymer is formed in the presence of an inert organic solvent selected from the group consisting of chlorinated aromatic and aliphatic hydrocarbons, aliphatic and cycloaliphatic ketones, cyclic ethers, cyclic amides, N,N-dialkyamides of monoalkanoic acids with 1 to 3 carbon atoms in the acid moiety, alkyl esters of monoalkanoic acids with a total of 2 to 6 carbon atoms, ethylene monoalkyl ethers and ethylene dialkyl ethers with 1 to 4 carbon atoms in the alkyl moieties, sulfolane, tetramethylurea, hexamethylphosphoramide, dimethyl sulfoxide and diethyl sulfoxide.

15. A crosslinked polymer obtained by heating a mixture according to claim 1 at a temperature of about 50° to 250° C in the presence of a radical initiator selected from the group consisting of inorganic peroxides, organic peroxides and azo compounds.

16. A crosslinked polymer obtained by heating a mixture according to claim 1 at a temperature of about 150° to 350° C.

17. A crosslinked polymer obtained by subjecting a mixture according to claim 1 to irradiation by electromagnetic waves selected from the group consisting of X-rays and UV light.

18. A crosslinked polymer according to claim 17 where the electromagnetic irradiation is carried out in the presence of a sensitizer selected from the group consisting of benzene, 1,4-diacetylbenzene, phenol, benzonitrile, acetophenone, benzophenone, benzaldehyde, diisopropyl ketone and fluorene.

19. A crosslinked polymer obtained by heating a prepolymer according to claim 11 at a temperature of about 50° to 250° C in the presence of a radical iniator selected from the group consisting of inorganic peroxides, organic peroxides and azo compounds.

20. A crosslinked polymer obtained by heating a prepolymer according to claim 11 at a temperature of about 150° to 350° C.

21. A crosslinked polymer obtained by subjecting a prepolymer according to claim 11 to irradiation by electromagnetic waves selected from the group consisting of X-rays and UV light.

22. A crosslinked polymer according to claim 21 where the electromagnetic irradiation is carried out in the presence of a sensitizer selected from the group consisting of benzene, 1,4-diacetylbenzene, phenol, benzonitrile, acetophenone, benzophenone, benzaldehyde, diisopropyl ketone and fluorene.

* * * * *